Oct. 16, 1951            E. R. PECK            2,571,937
INTERFEROMETER WITH RIGHT ANGLE REFLECTOR
SURFACES AT END OF EACH DIVIDED BEAM
Filed Aug. 27, 1948            4 Sheets-Sheet 1
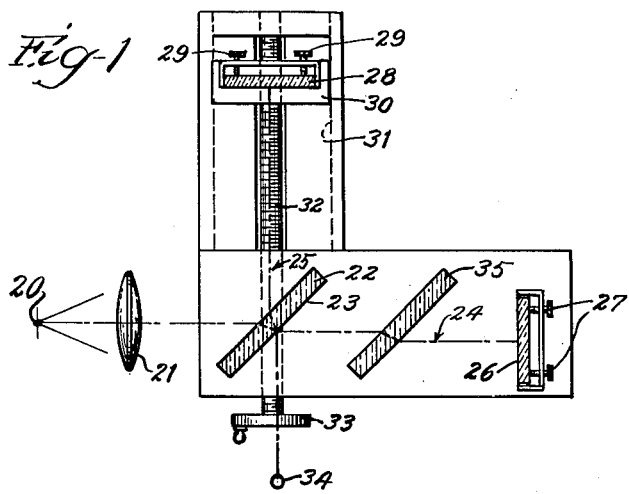
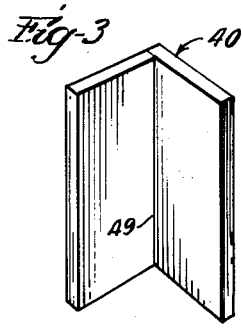
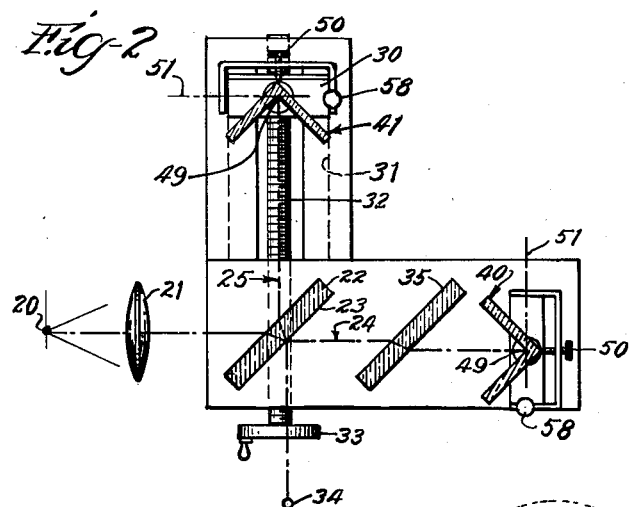
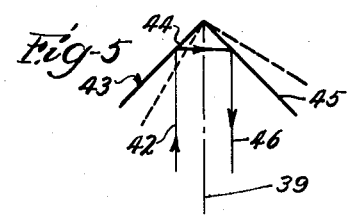
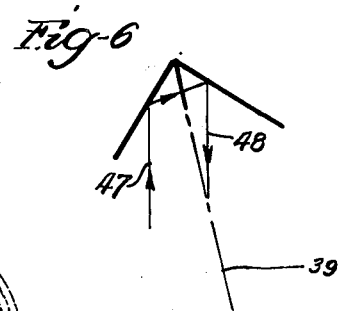
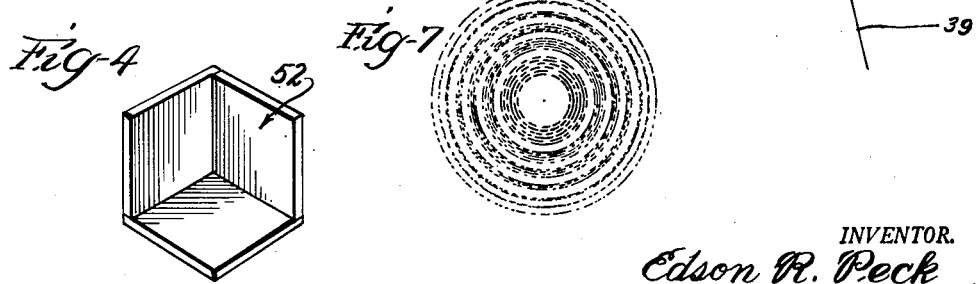
INVENTOR.
Edson R. Peck
BY
Mann and Brown
Attys.

INVENTOR.
Edson R. Peck.
BY
Mann and Brown
Attys.

Oct. 16, 1951
E. R. PECK
2,571,937
INTERFEROMETER WITH RIGHT ANGLE REFLECTOR
SURFACES AT END OF EACH DIVIDED BEAM
Filed Aug. 27, 1948
4 Sheets-Sheet 3
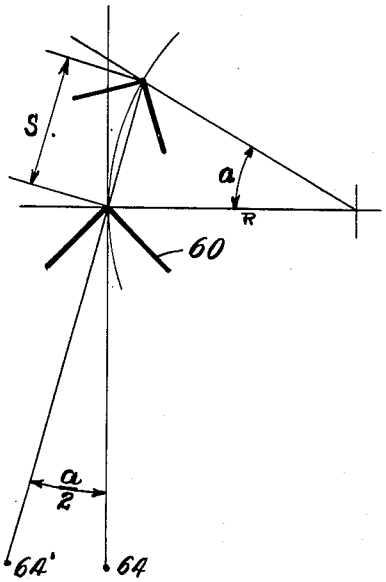
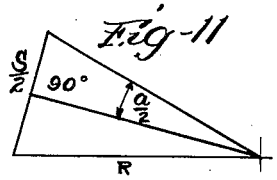
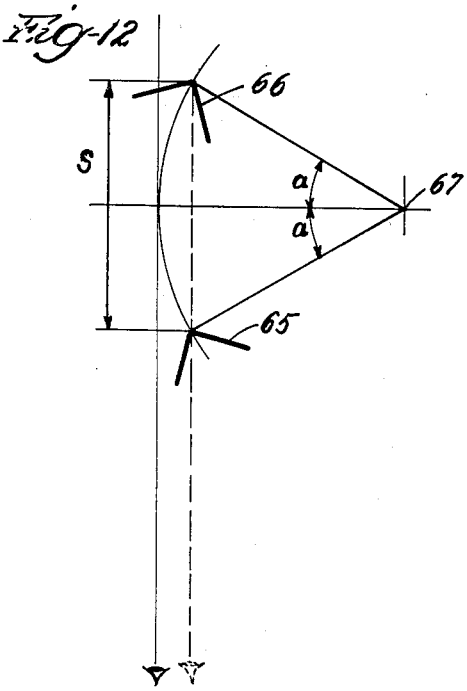
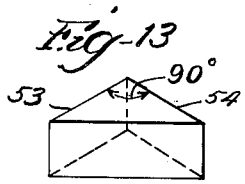
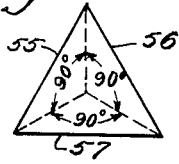
INVENTOR.
Edson R. Peck.
BY
Mann and Brown
Attys.

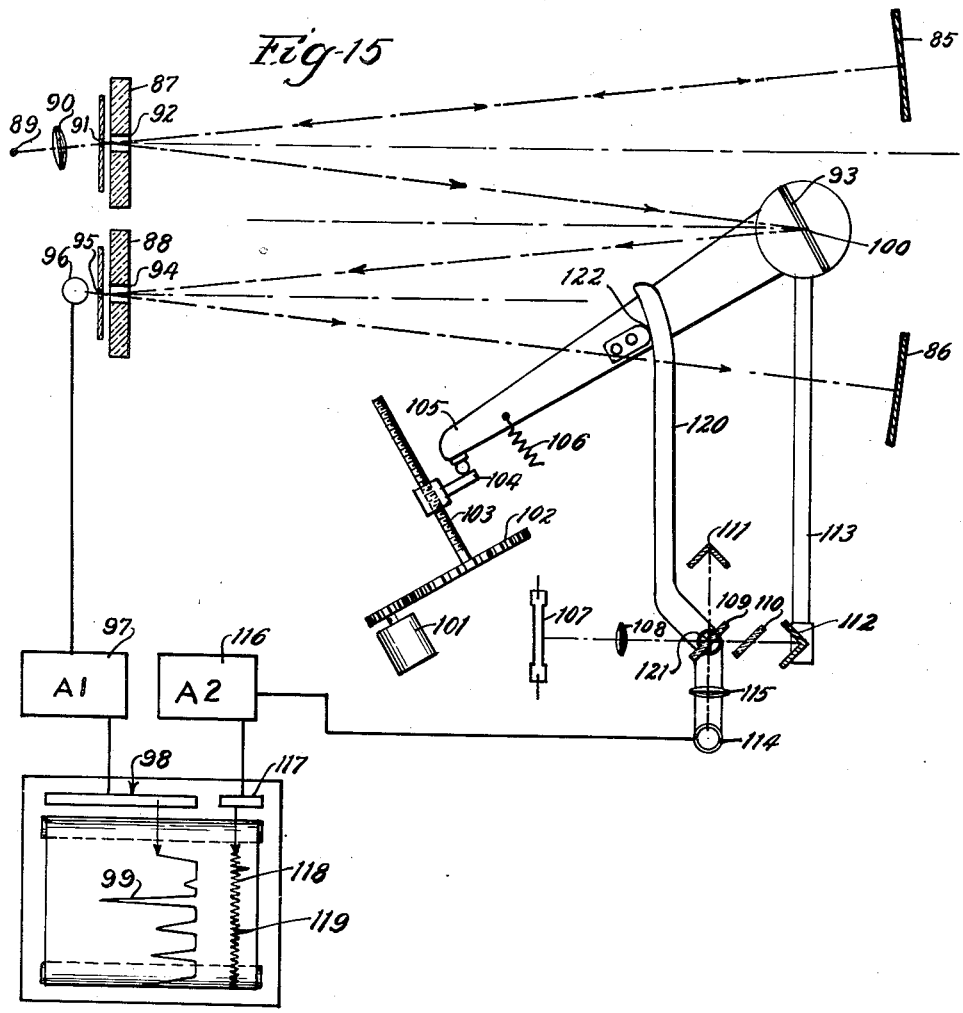

Patented Oct. 16, 1951

2,571,937

UNITED STATES PATENT OFFICE 2,571,937

INTERFEROMETER WITH RIGHT-ANGLE REFLECTOR SURFACES AT END OF EACH DIVIDED BEAM

Edson R. Peck, Evanston, Ill., assignor to Research Corporation, New York, N. Y., a corporation of New York Application August 27, 1948, Serial No. 46,520

2 Claims. (Cl. 88—14)

The Michelson interferometer is well-known and may be found described in many text books (see "Physical Optics" by Robert W. Wood, 1934 ed., at page 292, et seq., by way of example). The present invention relates generally to this type of interferometer and both simplifies its adjustment and greatly extends its field of use.

These and other objects and advantages will become apparent as the description proceeds and the disclosure is read in conjunction with the accompanying drawings, in which Fig. 1 shows a conventional Michelson interferometer, and this figure will be used to point out how the present invention differentiates from this well-known type of interferometer;

Fig. 2 is a view corresponding to Fig. 1 but showing the Michelson interferometer modified by the incorporation of one embodiment of the present invention;

Fig. 3 is a perspective view showing a right angle front surface mirror;

Fig. 4 is a perspective view showing a triple arangement of right angle front surface mirrors;

Figs. 5 and 6 are views which will be used in explaining some of the advantages of right angle reflecting surfaces;

Fig. 7 shows the interference pattern that one sees in employing an interferometer of this general type;

Figs. 10, 11 and 12 are diagrams that will be used in explaining the manner in which linear displacement of one or more of the reflecting surfaces of the interferometer may be translated into terms of angular displacement;

Figs. 13 and 14 are perspective views showing how prisms may be substituted for the double and triple front surface mirrors of Figs. 3 and 4 respectively; and Fig. 15 shows in diagram an application of the present invention to a spectrograph for obtaining accurate determinations of light energy peaks in a spectrum in terms of wave lengths of light.

Figure 8:
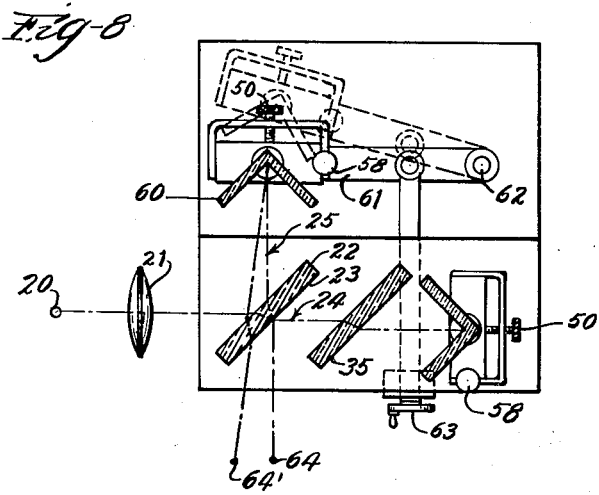
Fig. 8 is a plan view showing an application of the present invention to the measurement of angular displacements.

The Michelson interferometer is used for the accurate comparison of two light paths, one of which may be regarded as of standard or known length, and the other of variable or unknown length. Accordingly, the instrument may be used to measure restricted linear displacement of the mirror interposed in the variable light path and hence obtain standards of length in terms of wave length of light, or it may be used to determine the refractive index of transparent plates or gasses, etc., and the dispersion of light by such plates, gasses, and other transparent media.

The principle of the Michelson interferometer is shown diagrammatically in Fig. 1, and a clear understanding of its theory of operation is an important part of the disclosure of the present invention.

Referring now to Fig. 1, which shows in diagram a conventional form of Michelson interferometer, the reference character 20 designates a source of monochromatic light such as sodium or cadmium which is normally formed into a beam by a lens 21, which beam is then projected upon dividing plate 22 half silvered on its remote face 23, whereby a part of the beam takes an optical path indicated generally by the ray line 24 and the other part takes an optical path indicated by the ray line 25.

A front surface mirror 26 is associated with the optical path 24, and this mirror when once adjusted to exact normalcy to the ray line 24 remains fixed. This adjustment is effected by adjusting screws 27, of which there are ordinarily four, one at each corner of the mirror, whereby the mirror may be adjusted to bring about the desired normal position of the mirror to the incident ray 24.

A second front surface mirror 28 is mounted for linear displacement along the optical path 25, and it must be adjusted to an exact right angular position with respect to the ray 25, this being accomplished by adjusting screws 29 similar in location and purpose to the adjusting screws 27. The mirror 28 is mounted on a cross head 30 which is moved along its guideway 31 by a fine screw 32 which may be operated by a hand wheel 33.

A person viewing the interferometer from the point of view 34 will see an interference pattern of the general form shown in Fig. 7 due to the reuniting of the two optical paths 24 and 25.

Since the light following the optical path 25 must pass through the dividing plate 22 and be refracted accordingly, a similar transparent plate 35 is provided in the optical path 24 to compensate for the refraction in the dividing plate 22, and the plate 35 is commonly called a compensating plate.

In order to obtain a good interference pattern, the mirrors 26 and 28 must be kept in exact adjustment, and any deviation of the mirrors from their adjusted planar position will adversely affect the pattern.

The present invention substitutes for each of the mirrors 26 and 28 a reflecting device comprising two or more right angle reflecting surfaces with the result that the position of the right angle reflecting surface may be altered fairly substantially without adversely affecting the interference pattern. This will better be understood by referring to Fig. 2 in which a Michelson interferometer is shown modified to the extent of having a right angle, front surface mirror 40 substituted for the plane mirror 26 of Fig. 1, and a similar right angle front surface mirror 41 substituted for the plane mirror 28, also of Fig. 1. To the extent that the components of the modified interferometer shown in Fig. 1 correspond to those in Fig. 2, like reference characters are used, and it will be observed that mirror 40 is mounted so that the plane which bisects the right angle between the mirrors lies substantially in alignment with, though not necessarily coincident with, the optical path 24, and similarly the bisector plane for the mirror 41 lies in substantial alignment with, but not necessarily coincident with, the optical path 25.

The reason it is unnecessary for the bisector planes of the mirrors 40 and 41 to be in exact alignment with the associated optical path is shown in Figs. 5 and 6 where it will be seen that a ray of light 42 striking a right angle reflecting surface 43, arranged with its bisector plane 39 parallel to the incident ray 42, will be reflected laterally by the first reflecting surface 44 and then rearwardly by the second reflecting surface 45 so that the emergent ray 46 is parallel to the incident ray 42. Likewise, when the right angle reflecting surface 43 is rotated about an axis through the intersection of the reflecting surface to a position such as shown in dotted lines in Fig. 5 and reproduced in full lines in Fig. 6, an incident ray 47 will be reflected by the right angle reflecting surfaces in such manner as to cause the emergent ray 48 to be parallel to the incident ray 47, even though the bisector plane indicated by the line 39 is not parallel to the incident and emergent rays 47 and 48.

The result is that for a right angle reflecting surface, such as the front surface corner mirrors 40 and 41, the only critical adjustment that is required is for the intersection line between adjacent mirrors indicated at 49 to be normal to the associated light beam, and this may be accomplished by a single adjusting screw 50 which rocks the mirror 40 about an axis 51 with a similar adjustment being provided for the mirror 41, as indicated by corresponding reference characters. In addition, a far less critical adjustment in another plane is required to have the image of the mirror 40 as reflected from the surface 23 of the dividing plate 22 parallel to the directly viewed mirror, and this can be accomplished by adjusting screw 58.

Ordinarily it is not necessary to provide separate adjustments for the mirror 28 in Fig. 1 and the right angle mirror 41 of Fig. 2, because the adjustment of the other mirror brings it into right angle relationship, but the added adjustment has some advantages and is therefore shown and described.

The modified interferometer shown in Fig. 2 is capable of all the uses to which the Michelson interferometer of Fig. 1 is customarily put, and in addition, has other uses that will later be described. Even when put to conventional uses, the modified interferometer has the distinct advantage of requiring fewer and less precise adjustments due to the ability of the right angle mirrors to be rotated about the axis through the intersection of the right angle mirrors, without adversely affecting the interference pattern.

Instead of using double front surface mirrors, such as mirrors 40 and 41 of Fig. 2, a still further advantage may be gained by employing three front surface right angle mirrors such as shown at 52 in Fig. 4. These triple mirrors, when substituted for the mirrors 40 and 41, are arranged so that their common bisector (the line formed by the intersection of the bisector planes for each of the three right angles between the three mirror surfaces) lies substantially in alignment with, but not necessarily coincident with, the axis of the associated beam of light. A triple mirror of this type permits a very crude adjustment to be made between the two reflecting devices associated with each optical path inasmuch as a characteristic of the triple right angle mirror is that emergent rays will parallel incident rays, even when the common bisector is substantially out of alignment with the axis of the associated beam.

In one sense, the triple right angle mirror of Fig. 4, when used in place of the mirrors 40 and 41, may be said to obviate the necessity of the micrometer adjustment effected by the screws 50 and 58 because a rough adjustment of the common bisector along the axis of the associated beam will suffice to permit satisfactory interference patterns to be obtained.

Instead of using double or triple front surface right angle mirrors, it is possible to employ prisms which provide corresponding reflecting surfaces as shown, for example, in Figs. 13 and 14, respectively. In Fig. 13, the rear faces 53 and 54 are the reflecting surfaces of the prism, and in Fig. 14, the rear surfaces 55, 56 and 57 are the reflecting surfaces of the triple face prism.

In the case prisms are used of the type shown in Figs. 13 and 14, some correction may be required for the refraction of the prisms, but, in most instances, it is unnecessary.

It should be understood that through this specification and in the drawings where double front surface mirrors are shown and described, it is intended that triple mirrors (Fig. 4) or double reflecting prisms (Fig. 13), or triple reflecting prisms (Fig. 14) may be substituted for the double front surface mirrors.

In Fig. 8, there is diagrammatically shown an application of the present invention to the measurement of angular displacements in terms of wave lengths of light. In this instance, the movable reflecting surface 60, consisting of right angle front surface mirrors, is mounted on an arm 61 pivoted about a center 62 and controlled in its movement by a hand wheel 63. As before, in the case of two face right angle mirrors, adjusting screws 50 and 58 are provided for each mirror to effect parallelism with the axis of rotation of the arm 61. The arm, in moving from the position shown in full lines to some other position, such as shown in dotted lines, has the effect of rotating the reflecting surface 60 about its vertical axis, but, since as previously explained, emergent rays are parallel to incident rays even when the mirror is in this angularly displaced position, it does not effect the interference pattern when viewed from the point of view 64 or some slightly displaced point of view 64' occasioned by the shifting of the vertical axis of the right angle mirror 60 (i. e., the line of juncture between the two reflecting surfaces) laterally because of the arc through which it traverses. Hence the improved interferometer may be used for measuring angular displacements of the arm 61 about the center 62 in terms of wave lengths of light by counting the fringes as the arm is moved through the selected angular displacement.

This may then be translated into degrees of angular rotation by applying the formula $$a = 2 \text{ arcsine} \left(\frac{S}{2R}\right)$$

in which $a$ is the angle through which the arm is rotated, S is the chord length measured by the motion of the fringes and R is the radius of the arc on which the mirror moves. By referring to Figs. 10 and 11, it will be seen that the mathematical relation between angle $a$ and the chord length measured by the fringes is $$\frac{S}{2} = R \text{ sine} \left(\frac{a}{2}\right)$$

In solving this equation for $a$, it is found that $$a = 2 \text{ arcsine} \left(\frac{S}{2R}\right)$$

Figure 9:
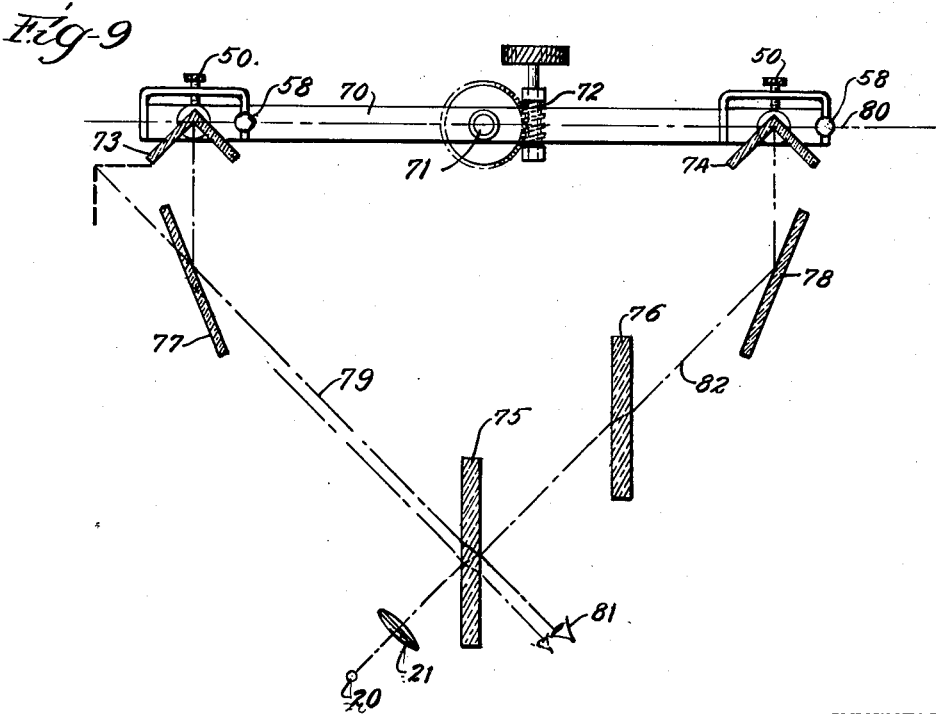
Fig. 9 shows a modification of the device for measuring angular displacements.

In Fig. 9 a modification of the invention is shown for measuring angular displacements, but in this case, any errors due to looseness of the bearing about which the arm swings are automatically compensated for. In this embodiment of the invention, the member whose angular displacement is to be measured is indicated at 70 and it is pivoted about center 71 with the angular movement of the arm being effected in any suitable manner, as for example, by a worm gear drive 72.

At each end of the arm 70 and equidistant from the center 71 are right angle reflectors 73 and 74 arranged with the intersection lines between mirrors (in the case of a two face right angle mirror) normal to the axis 80 of the arm, or substantially so, and parallel to the axis of rotation of the arm 70. The other interferometer components consist of a dividing plate 75, a compensating plate 76, and two front surface mirrors 77 and 78 arranged to reflect the divided beam of light to and from the right angle mirrors 73 and 74, respectively. In this case, the optical path of both beams of light, after being divided by the dividing plate 75, are altered, the path indicated by the ray 82 being shortened while the path indicated by the ray 79 is lengthened when the arm 70 is angularly displaced in a clockwise direction. Inasmuch as lateral displacement of the arm 70 with respect to its longitudinal axis 80 causes a corresponding increase or decrease of optical path for both of the divided beams, no error is introduced by reason of such movement, and likewise movement to the right or left along the longitudinal axis 80 does not adversely affect either the length of the optical path or the interference pattern seen at the point of view 81.

In order to translate fringes counted upon a given angular displacement of the arm 70 into terms of degrees of angular rotation, it is only necessary to apply the formula $$a = \text{arcsine} \left(\frac{S}{2R}\right)$$

in which $a$ is the angle through which the arm is rotated, S is the chord length measured by the interferometer, and R is the radius of the arc along which each mirror rotates. The derivation of this formula may be understood by referring to Fig. 12. In that figure, the image of mirror 73, indicated by the reference character 65, and the image of mirror 74, indicated by the reference character 66, both appear to move about a center of rotation 67 which is located on the side of the mirror 77 (Fig. 9) opposite from that of the bearing center 71 and an equal distance therefrom. In other words, the apparent center of rotation is on a line normal to the front surface mirror 77 with the mirror equidistant from the true and apparent centers of rotation.

Since the interferometer measures the chord length S (Fig. 12), we have the mathematical relationship $$\frac{S}{2} = R \text{ sine } a$$

from which we find that $$a = \text{arcsine} \left(\frac{S}{2R}\right)$$

The application of the present invention to a grating spectrograph is shown in Fig. 15. The object is to obtain a degree of accuracy in recording grating angles that is commensurate with the resolving power of the spectrometer. The optics of the spectrometer are based upon a grating replica mosaic with collimating and telescopic arrangements of the Pfund type using paraboloids 85 and 86 in conjunction with flats 87 and 88. The light source to be analysed is indicated at 89; it is condensed at 90, passes through an entrance slit 91 and an opening 92 in the flat 87 to the paraboloid 85, is then reflected to the flat 87, thence to the reflecting grating 93, thence to the flat 88, paraboloid 86, and back through an opening 94 in the flat 88 where the resolved spectrum band passes through an exit slit 95 upon a photocell 96.

The photocell 96 is operatively connected with an amplifier 97 and an indicator generally designated 98, whereby a graphical representation of the energy spectrum is transcribed upon a moving chart as indicated by the graph line 99.

During the operation of the spectrograph and the recording of the energy spectrum indicated by the pen line 99, the grating 93 is rotated at a constant speed about its center 100, this being effected by a constant speed motor 101 operating through a suitable gear train 102 which rotates a shaft 103 upon which a threaded block 104 is mounted, which in turn bears against the end of a rigid arm 105 which constitutes a part of the grating mounting. A spring 106 or equivalent means is used to keep the arm 105 in firm bearing engagement with the block 104.

An interferometer of the type employing right angle reflecting surfaces as described herein is operatively associated with the grating mounting to accurately record angular displacement of the grating in relation to the energy spectrum recorded by the indicator 98. The interferometer comprises a monochromatic light source 107, condensing lens 108, dividing plate 109, compensating plate 110 with a fixed right angle reflecting surface 111 and a movable right angle reflecting surface 112, the latter being carried by a rigid arm 113 constituting a part of the grating mounting.

In this instance, a photocell 114 is used to count the interference fringes as the grating 93 is moved about its center, the lens 115 focusing the fringes upon the cell 114 and causing an impulse to be delivered to the amplifier 116 each time a fringe moves out of the pattern. These impulses are recorded by a second indicator 117 on the same moving chart that records the energy spectrum with each jog in the graph line 118 corresponding to a wave length of light. If desired, an electronic counting circuit may be included with the amplifier 116 to automatically indicate tens, hundreds, and thousands of wave lengths to facilitate wave length counting, these larger indications being shown at 119, by way of example.

Inasmuch as the movement of the right angle mirror 112 along an arc slightly changes the point of view for the photocell, it is desirable that the photocell with its associated lens 115 be mounted on an arm 120 pivoted at 121 and having a cam engagement with the arm 105 as indicated at 122. The cam 122 is appropriately shaped to displace the point of view of the photocell 114 to the correct position for proper focusing at all times of the interference pattern upon the photocell.

The interferometer described herein is capable of measuring displacement independently of rotation over a range of motion up to twenty centimeters or more, with an accuracy on the order of $1/100$ thousandths of an inch with a linear scale in terms of wave lengths of light. This precision makes it ideally suited for such uses as a precision strain gauge, by way of example. It also permits the measurement or control of angular motion by interferometric measurement of chord or tangent length as has already been described. With a lever arm of thirty centimeters and using cadmium red light, the interferometer will record the passing of one fringe for a rotation of the order of $1/4$ second of arc.

It should be noted that when an angular measurement is made with a right angle reflecting surface mounted on a pivoted arm in the manner shown in Figs. 8 and 10, the line of sight is angularly displaced and, hence, the point of view 64 is moved from 64 to 64', whereas when right angle reflecting surfaces are used in the manner disclosed in Figs. 9 and 12, the line of sight while shifting laterally, remains parallel to the original line of sight and merely displaces the point of view from 81 to 81', and is without any optical significance, because a condensing lens may be used to collect the rays without changing the focal point.

Also, it should be noted that when adjusting the various embodiments of the invention for proper lines of sight, this may be effected by merely moving the reflecting surfaces to their appropriate lateral position.

Many modifications will suggest themselves to those skilled in the art, and the appended claims should be construed accordingly.

I claim:

1. In a spectrograph, the combination of means for forming a spectrum of the light to be analyzed, means for progressively focusing the component wave lengths upon an energy measuring device, said focusing means including a rotatable platfform the angular displacement of which is to be accurately measured in terms of wave lengths of light, an indicator operatively associated with the energy measuring device for graphically showing energy levels for the different components of the spectrum, and a second indicator for graphically indicating wave lengths of light against the energy levels recorded by the first indicator, and an interferometer of the Michelson type for operating said second indicator, said interferometer including a light source, means for dividing a beam of light from said source into two paths and then reuniting the divided beam to form an interference pattern, right angle reflecting surfaces associated with each of the divided beams, one of said surfaces being carried by said spectrum focusing means and having its bisector plane substantially in alignment with the divided beam of light associated therewith, and a photocell and electrical circuit connected thereto and adapted to produce electrical impulses as successive fringes pass out of the pattern, said photocell and electrical circuit being operatively connected to the second indicator for graphically correlating wave lengths of light with the energy spectrum recorded by the first indicator.

2. In an interferometer, a light source, a dividing plate dividing light from said source into two parallel-ray light beams, each of which follows an optical path that terminates with a device having at least two right angle reflecting surfaces, said device being characterized by its ability to return an entering ray back along its associated optical path in a direction parallel to the entering ray, said devices cooperating to return the divided components of any given ray entering the dividing plate from said source to the same point on said dividing plate, whereby an interference pattern may be established for viewing and analysis, means for mounting one of said devices on a pivot arm for movement about a pivot removed from the apex of the right angle reflecting surfaces of said one device, means including a photocell, a photocell mounting, and an electrical circuit for indicating the number of interference fringes that pass a given point as said one reflecting device is moved by angular displacement of said pivoted arm, and means for shifting the photocell mounting in functional relation to the movement of said pivoted arm.

EDSON R. PECK.

REFERENCES CITED

The following references are of record in the file of this patent:

UNITED STATES PATENTS

| Number | Name | Date |
|---|---|---|
| 1,455,795 | Logan | May 22, 1923 |
| 1,625,625 | Ricker | Apr. 19, 1927 |
| 1,901,632 | Chamberlain | Mar. 14, 1933 |
| 2,462,292 | Snyder | Feb. 22, 1949 |

FOREIGN PATENTS

| Number | Country | Date |
|---|---|---|
| 489,880 | Germany | Jan. 20, 1930 |
| 555,672 | Great Britain | Sept. 2, 1943 |
| 595,940 | Great Britain | Dec. 23, 1947 |

OTHER REFERENCES

Twyman: Article in Transactions of the Optical Society, vol. XXIV, pages 189 to 197 inclusive; 1922–1923. Printed by Cambridge University Press, Great Britain.